March 2, 1948.  J. W. DAWSON  2,436,794
METHOD AND APPARATUS FOR CHARGING AN ELECTRICAL CONDENSER
Filed Aug. 2, 1945

INVENTOR.
JOHN W. DAWSON,
BY [signature]
ATTY.

Patented Mar. 2, 1948

2,436,794

UNITED STATES PATENT OFFICE 2,436,794

METHOD AND APPARATUS FOR CHARGING AN ELECTRICAL CONDENSER

John W. Dawson, West Newton, Mass., assignor to Raytheon Manufacturing Company, Newton, Mass., a corporation of Delaware Application August 2, 1945, Serial No. 608,540

10 Claims. (Cl. 320—1)

1

This invention relates to the charging of electrical storage condensers. It is frequently desired to charge an electrical storage condenser from a relatively low voltage source to a potential much higher than said source. For example, in electrical welding systems of the condenser storage type, it is frequently desired to charge the condenser to a potential of over 1000 volts from a relatively low voltage source. Although the voltage may be stepped up in a transformer, there are practical limitations upon the increase to the potential that may be obtained in this manner.

It is among the objects of the present invention to provide a method of and an apparatus for charging electrical storage condensers to a high voltage from a source which is of low voltage and delivers a low KVA.

To the above objects and ends the invention contemplates a system in which a condenser is charged through a circuit which is resonant at the frequency of the alternating source and so arranged that the voltage on the condenser will oscillate as an increasing sine-like wave until it attains a high value after which the oscillating charge is trapped upon the condenser in the desired polarity.

Figure 1:
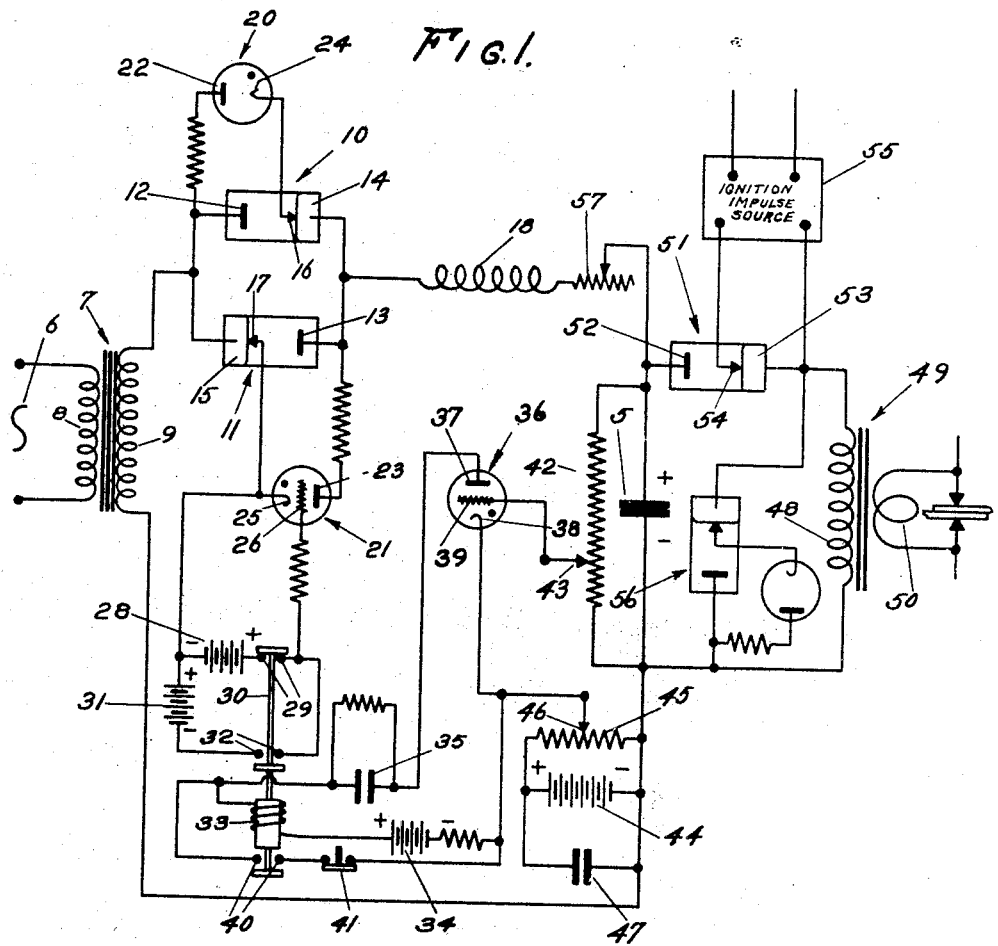
Figure 2:
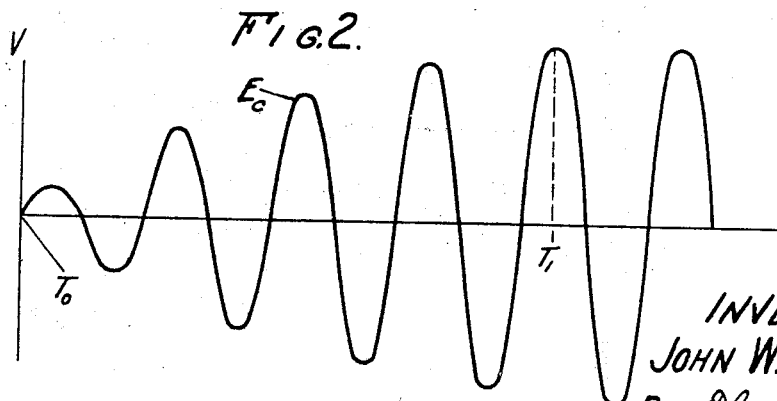

The attainment of the above and other objects and features of the invention will be made fully apparent to those skilled in the art from a consideration of the following detailed description taken in conjunction with the accompanying drawing in which:

Fig. 1 shows a wiring diagram of a system constructed in accordance with the present invention; and Fig. 2 shows a set of curves useful in explaining certain operating characteristics of the present invention.

Referring to the drawing, and first to Fig. 1 thereof, reference numeral 5 indicates a condenser intended to be charged from a source of alternating current 6 of relatively low voltage and of relatively low KVA. The condenser 5 is charged through a transformer 7, the primary winding 8 of which is connected to the alternating current source 6. The secondary winding 9 of the transformer 7 has one end connected directly to one side of the condenser 5 and its opposite end connected to the other side of the condenser through a pair of controlled gaseous discharge tubes 10 and 11. The tubes 10 and 11 are of the type capable of carrying high current and are disposed in inverse relation. In the instance shown, the tubes 10 and 11 are of the ignitron type hav-

2 ing anodes 12 and 13 and mercury pool type cathodes 14 and 15, respectively.

The firing of the tubes 10 and 11 is controlled by resistance-immersion igniters 16 and 17, respectively. An impedance 18 is provided in the charging circuit, the value of which impedance is so correlated to the other parameters of the charging circuit of the condenser 5 that the circuit is resonant at the frequency of the alternating current source 6.

If the resistance of the circuit is relatively low, the frequency $f$ of the source is related to the inductance L and the capacitance C of the circuit as follows:

$$f = \frac{1}{2\pi\sqrt{LC}}$$

The tubes 10 and 11 are so arranged and so energized that current is permitted to flow freely in either direction in the circuit and thus oscillate at the resonant frequency. Current will increase as an increasing sine-like wave such as the curve $E_c$ of Fig. 2. The sine-like wave continues to increase in intensity until $RI = E$, which is the voltage applied to the oscillatory circuit by the circuit 9, 10, 11. The energy applied from the source will then maintain a steady or constant value of A. C. If the resistance were zero the current would rise to infinity and so would the maximum value of the charge on the condenser 5, even if the applied voltage were only of the order of a volt of frequency $f$. It is, therefore, desirable that the resistance be as low as possible. As the current surges back and forth in the resonant circuit the electrical energy is alternately shifted back and forth between the magnetic field of the coil and the electric field of the condenser, receiving at each oscillation an increment from the source 6. Fig. 2 illustrates the variation with time of the voltage $E_c$ on the condenser. As shown in this figure the increments decrease in value until the energy applied from the source is only sufficient to maintain a steady or constant value of A. C. At the time $T_1$ when the maximum voltage on the condenser 5 has attained a constant value, the energy supplied by the generator to maintain the oscillation at this value is dissipated in the circuit. Thus, in order to avoid the loss of energy and the unecessary heating of the tubes, it is desirable to trap the charge on the condenser in the proper polarity as soon as possible after the time $T_1$.

In order to trap the charge on the condenser 5 in the desired polarity and yet permit the charge to oscillate freely during the period in which it is being built up, the control electrodes or igniters of the two tubes 10 and 11 are connected to the respective anode circuits through rectifying tubes 20 and 21. The tubes 20 and 21 are preferably of the gaseous discharge type having anodes 22 and 23 connected to the anode sides of tubes 10 and 11 through current-limiting resistors and permanently energized cathodes 24 and 25 connected respectively to the igniters 16 and 17. The tube 21 is also supplied with a control grid 26. During the period when the energy of the oscillating circuit is being built up, the grid 26 is supplied with a positive bias in a manner hereinafter described. During this period then as the charge oscillates, an igniting impulse is supplied to one or the other of the resistance-immersion igniters 16 and 17 whenever the current swings in the direction in which the respective tube 10 or 11 is conductive. If after the maximum condenser voltage has reached the desired value a blocking potential is applied to the grid 26 of the tube 21, then on the next succeeding half-wave in the direction in which the tube 11 is conductive, no igniting impulse will be supplied to the igniter 17 and the tube 11 will not conduct, thus preventing a further reversal of the charge upon the condenser 5. The charge will thus be trapped upon the condenser in the proper polarity. It will be noted that the timing of the application of the blocking potential to the grid 26 of the tube 21 with respect to the phase of the cycle of alternating current is not material as long as the blocking potential is applied after the maximum voltage has reached the desired value. For example, if the blocking potential happens to be applied at the time when the tube 11 is conductive, then the tube 11 will continue conductive until the end of this half-wave of the alternating current cycle. On the next half-wave the tube 10 will conduct the charge back to the condenser 5 in the desired polarity where it will then be trapped by reason of the blocking potential applied to the grid 26 preventing the firing of this tube and thereby preventing the firing of the tube 11. The application of the blocking potential to the tube 21 may, therefore, be made dependent upon a simple time delay circuit effective after the maximum condenser voltage has attained its constant value. However, since any oscillations of the circuit after the energy thereof has attained a constant value result merely in a loss of energy supplied from the source 6, it is desirable to discontinue the oscillations and trap the energy on the condenser 5 in the proper polarity as soon as possible after the desired potential has been reached. To this end the grid 26 is normally supplied with a positive bias from a battery 28 through a pair of normally closed contacts 29 of a relay 30. The battery 28 which normally drives the grid 26 positive may be cut out of the cathode-grid circuit and a negative bias applied to the grid from a battery 31 by way of contacts 32 which are normally open but which are closed when relay 30 is energized. The relay 30 is actuated by a coil 33 which coil is energized from a battery 34 through a circuit including in series a condenser 35 and a gaseous discharge tube 36, having its anode 37 connected to the position side of the battery through the condenser 35 and coil 33 and its cathode 38 connected to the negative side of the battery. When the coil 33 of the relay 30 has been energized, the relay is held in closed position by means of a shunt circuit including a pair of normally open contacts 40 which are closed when the relay is energized and a normally closed switch 41. Thus once a blocking potential is applied to the grid 26 by the opening of the contacts 29 and the closure of the contacts 32, the relay will remain in the energized position until the push button switch 41 is actuated.

In order to supply the grid 39 of the tube 36 with a negative blocking potential until the charge on the condenser 5 reaches a desired value, I provide a bridging resistor 42 across the condenser 5 having an adjustable tap 43 connected to the grid 39. A battery 44 provides a source of reference voltage which is applied to the cathode-grid circuit of tube 36 across an adjustable portion of a resistor 45, the cathode 38 being connected by an adjustable tap 46 to the positive side of the resistor 45 and the grid 39 being connected to the negative side of said resistor through a portion of the resistor 42 and the tap 43. Preferably a condenser 47 is shunted across the terminals of battery 44.

In operation the grid 39 will normally be driven negative relative to the cathode 38 by the voltage derived from the battery 44. At this time the relay 30 will be deenergized and a positive bias will be supplied to the grid 26 of tube 21 permitting this tube to fire on alternate half cycles of the charging current in the charging circuit of the condenser 5. The tube 11 is thus fired whenever the alternating potential is applied in the direction in which the tube is conductive. As the peak voltage of the oscillations increases, a point is reached where, when the potential is positive on the upper side of the condenser 5, the tap 43 becomes sufficiently positive relative to the lower end of the resistor 42 so that the negative potential applied to the grid 39 by the battery 44 is offset and the grid 39 is driven positive. The tube 36 becomes conductive and the condenser 35 permits sufficient current flow through the coil 33 to energize the relay 30 closing the contacts 32 and opening the contacts 29, thus applying a negative bias potential to the grid 26 of the tube 21. As the contacts 40 are also closed upon the energization of the relay, the relay is held in energized position so that the negative bias continues to be applied to the grid 26 of tube 21, and the charge is thus trapped upon the condenser 5 in the proper polarity.

The trapped energy on the condenser 5 may now be discharged through a suitable load circuit such as a resistance welding load. In the instance shown, the condenser 5 is discharged through the primary winding 48 of a welding transformer 49 having a secondary winding 50, the opposite terminals of which are connected to the usual welding electrodes. The discharge of the condenser 5 may be controlled by means of a gaseous discharge device 51 such as an ignitron, the anode 52 of which is connected to the positive side of the condenser 5 and the cathode 53 of which is connected to one end of the primary winding 48 of the transformer 49. The cathode 53 may be of the liquid pool type and the tube may be fired by a resistance-immersion igniter 54 to which energizing impulses may be supplied from a suitable source 55 adapted in a known manner to supply an energizing impulse to the igniter 54 in timed sequence with the operation of the welding electrodes. Upon the discharge of the condenser 5, the energy remaining in the welding circuit may be permitted to decay substantially exponentially through a shunt circuit including a tube 56 adapted to be discharged in a known manner upon the reversal of the potential in the circuit.

It will be understood that instead of trapping the charge at the time $T_1$, when the voltage thereof has reached a predetermined maximum and no longer substantially increases upon successive oscillations, the charge may be trapped at any time prior to $T_1$ whenever it is desired to charge the condenser to a voltage less than the maximum voltage attained at the time $T_1$. That is to say, the charge may be trapped at any one of the successive increments in the positive direction. It will be understood that there may be a large number of oscillations of the charge prior to the attainment of the maximum voltage thereof.

In order to regulate the maximum swing on the condenser 5 a variable resistor 57 may be inserted in series in the charging circuit. A similar function may be performed by applying a phase-shifted control voltage to the reversely connected tubes 10 and 11 so that these tubes each conducts only a portion of a half cycle. Either way provides a means to vary the value of the increments supplied to the condenser and thus provides a means for regulating the maximum swing on the condenser.

Although there has been herein described a preferred embodiment of the invention, other embodiments within the scope of the appended claims will be apparent to those skilled in the art from a consideration of the form shown and the teachings hereof. Accordingly, a broad interpretation of the appended claims commensurate with the scope of the invention within the art is desired.

What is claimed is:

1. The method of charging a storage condenser from an alternating current source to a potential higher than the peak potential of said source comprising, applying alternating current from said source to a circuit resonant at the frequency of said source whereby the charge on said condenser alternates in direction and receives successive increments from said source, and disconnecting said condenser from said source at a time when the charge thereon is in a predetermined polarity and has attained a predetermined voltage above the voltage of said source.

2. The method of charging a storage condenser from an alternating current source to a potential higher than the peak potential of said source comprising, applying alternating current from said source to a circuit resonant at the frequency of said source whereby the charge on said condenser alternates in direction and receives successive increments from said source until a constant maximum voltage is attained, and disconnecting said condenser from said source at a time when the charge thereon is in a predetermined polarity at said constant maximum voltage.

3. The method of charging a storage condenser from an alternating current source to a potential higher than the peak potential of said source comprising, applying alternating current from said source to a circuit resonant at the frequency of said source to produce an alternating charge on said condenser, and trapping said charge on said condenser at a time when said charge is in a predetermined polarity and has attained a predetermined voltage above the voltage of said source.

4. A system for charging a storage condenser from an alternating current source to a potential higher than the peak potential of said source comprising, a circuit including said condenser and connected to said source, said circuit being resonant at the frequency of said source whereby the charge on said condenser alternates in direction and receives successive increments from said source, and means for disconnecting said condenser from said source at a time when the charge thereon is in a predetermined polarity and has attained a predetermined voltage above the voltage of said source.

5. A condenser charging system comprising a storage condenser, a source of alternating current, a circuit connecting said source of current and said condenser, said circuit being resonant at the frequency of said source whereby energy received from said source oscillates in said circuit with increasing amplitude, and means effective when the peak value of the oscillations in said circuit has attained a predetermined value for trapping said energy in said storage device in a predetermined polarity.

6. A condenser charging system comprising a storage condenser, a source of alternating current, a circuit connecting said source of current and said storage device, said circuit being resonant at the frequency of said source whereby energy received from said source oscillates in said circuit with increasing amplitude until a constant peak value of the oscillations is attained, and means effective when the peak value of said oscillations has attained said constant peak value for trapping said energy in said storage condenser in a predetermined polarity.

7. A condenser charging system comprising a condenser, a source of alternating current, a circuit connecting said source of current and said condenser, said circuit being resonant at the frequency of said source whereby energy received from said source oscillates in said circuit with increasing amplitude, and means effective when the peak value of said oscillations has attained a predetermined value for trapping said energy in said condenser in a predetermined polarity.

8. A condenser charging system comprising a condenser, a source of alternating current, a circuit connecting said source of current and said condenser, said circuit being resonant at the frequency of said source whereby energy received from said source oscillates in said circuit with increasing amplitude until a constant peak value of the oscillations is attained, and means effective when the peak value of said oscillations has attained said constant peak value for trapping said energy in said condenser in a predetermined polarity.

9. A condenser charging system comprising a condenser, a source of alternating current, a circuit connecting said source of current and said condenser, said circuit being resonant at the frequency of said source whereby energy received from said source oscillates in said circuit with increasing amplitude until a constant peak value of the oscillations is attained, a pair of inversely-connected gaseous discharge tubes interposed in said circuit, each of said tubes including a control electrode, means for energizing each of said control electrodes when the direction of said oscillations is in the direction in which its respective tube is conductive, and means effective when the peak value of said oscillations has attained a predetermined value blocking the supply of energizing impulses to one of said electrodes for trapping said energy in said condenser in a predetermined polarity.

10. A condenser charging system comprising a condenser, a source of alternating current, a circuit connecting said source of current and said condenser, said circuit being resonant at the frequency of said source whereby energy received from said source oscillates in said circuit with increasing amplitude until a constant peak value of the oscillations is attained, a pair of inversely-connected gaseous discharge tubes interposed in said circuit, each of said tubes comprising an anode, a pool type cathode and an igniting electrode adapted to initiate an arc spot on said cathode, means for energizing each of said igniting electrodes when the direction of said oscillations is in the direction in which its respective tube is conductive, and means effective when the peak value of said oscillations has attained a predetermined value to block the supply of energizing impulses to one of said electrodes thereby trapping said energy in said condenser in a predetermined polarity.

JOHN W. DAWSON.

REFERENCES CITED

The following references are of record in the file of this patent:

UNITED STATES PATENTS

| Number | Name | Date |
|---|---|---|
| 2,359,178 | White | Sept. 26, 1944 |
| 2,306,230 | Somerville | Dec. 22, 1942 |